United States Patent [19]

Pringle

[11] 4,021,077
[45] May 3, 1977

[54] DUAL TRUCK WHEEL ASSEMBLY HAVING AN ELLIPTICAL LOCKING CAM PLATE

[75] Inventor: William L. Pringle, Grosse Pointe Shores, Mich.

[73] Assignee: United States Steel Corporation, Pittsburgh, Pa.

[22] Filed: Sept. 5, 1975

[21] Appl. No.: 610,668

[52] U.S. Cl. .................... 301/13 SM; 301/63 D
[51] Int. Cl.² .................................. B60B 11/06
[58] Field of Search .......... 152/375, 376, 378, 385, 152/396, 220, 398; 301/1, 5 R, 10 R, 10 DC, 11 R, 13 R, 13 SM, 36 R, 36 A, 36 W, 36 P, 38 R, 40 R, 40 S, 63 D

[56] References Cited

UNITED STATES PATENTS

| | | | |
|---|---|---|---|
| 1,878,213 | 9/1932 | Walther | 301/13 R |
| 2,599,248 | 6/1952 | Forbes et al. | 301/13 SM |
| 3,143,376 | 8/1964 | Federico | 301/13 SM |
| 3,623,772 | 11/1971 | Walther | 301/13 SM |
| 3,811,736 | 5/1974 | DeRegnaucourt | 301/10 DC X |

Primary Examiner—Robert B. Reeves
Assistant Examiner—Charles A. Marmor
Attorney, Agent, or Firm—McGlynn and Milton

[57] ABSTRACT

A dual truck wheel assembly including a wheel having a hub rotatably supported on an axle. A pair of tire rims are removably supported on the wheel in axially spaced relationship to one another. Lugs and lug bolts secured to the wheel engage the outer rim for forcing the outer rim axially toward the inward rim for applying a retaining force to prevent rotation of the rims relative to the wheel. A rim lock assembly is disposed between the rims for continually re-establishing the retaining force in response to relative rotation between the rims in the event the lug bolts loosen. The rim lock assembly includes a plurality of elliptical cam plates engaging the adjacent rims. The cam plates have serrated peripheries whereby when the rims rotate relative to one another the frictional engagement between the cam plates and the rims causes the cam plates to rotate about a central axis urging the rims apart so that the outer rim is moved in a direction to place the lug bolts in tension.

25 Claims, 4 Drawing Figures

DUAL TRUCK WHEEL ASSEMBLY HAVING AN ELLIPTICAL LOCKING CAM PLATE

BACKGROUND OF THE INVENTION

The subject invention relates to a vehicle wheel assembly of the type including a wheel supporting a pair of removable tire rims where the tire rims are retained on the wheel by lugs and lug bolts. The rims are normally axially separated by a spacer and the lugs urge the outward rim into engagement with the spacer which, in turn, forces the inner rim into engagement with an annular tapered surface on the wheel. Such assemblies are used on vehicles such as trucks, tractors, trailers and the like.

One of the problems with such assemblies is that the lug bolts loosen allowing one or both of the tire rims to rotate relative to the wheel, which is referred to as rim slippage. There are numerous adverse consequences from such rim slippage. The rim may wobble slightly to cause excessive tire wear. Rim slippage allows the wheels to rotate relative to the tires upon abrupt clutching or abrupt braking. There could be excessive wear between the rims and the lugs and the spacer, etc.

Attempts have been made to solve this problem. One prior art solution is shown in U.S. Pat. No. 3,259,437 granted July 5, 1966 to S. A. Malthaner wherein there is disclosed lug assemblies of specific construction and configuration to increase the rim retaining force in response to rotation of the outer rim relative to the wheel. Another prior art solution is disclosed in U.S. Pat. No. 3,862,778 granted Jan. 28, 1975 to Thornton E. Cory wherein there is disclosed abutment members welded to the inner annular surface of the rims to be disposed in engagement with portions of the wheel to limit rotation of the rim relative to the wheel. Although the prior art solutions are satisfactory, they are inhibited in use by the fact that they require special construction and are not readily suitable for retrofitting wheel assemblies in current use.

SUMMARY OF INVENTION

The subject invention provides a spacer assembly of the type disposed axially between a pair of tire supporting rims which are removably retained on wheel means by clamping means which applies a retaining force between the wheel means and the rims to prevent rotation of the rims relative to the wheel means and which spacer includes a support means with rim lock means supported by the support means for re-establishing the retaining force in response to relative rotation between the rims.

DESCRIPTION OF DRAWINGS

Other advantages of the present invention will be readily appreciated as the same becomes better understood by reference to the following detailed description when considered in connection with the accompanying drawings wherein.

DESCRIPTION OF PREFERRED EMBODIMENT

Figure 1:
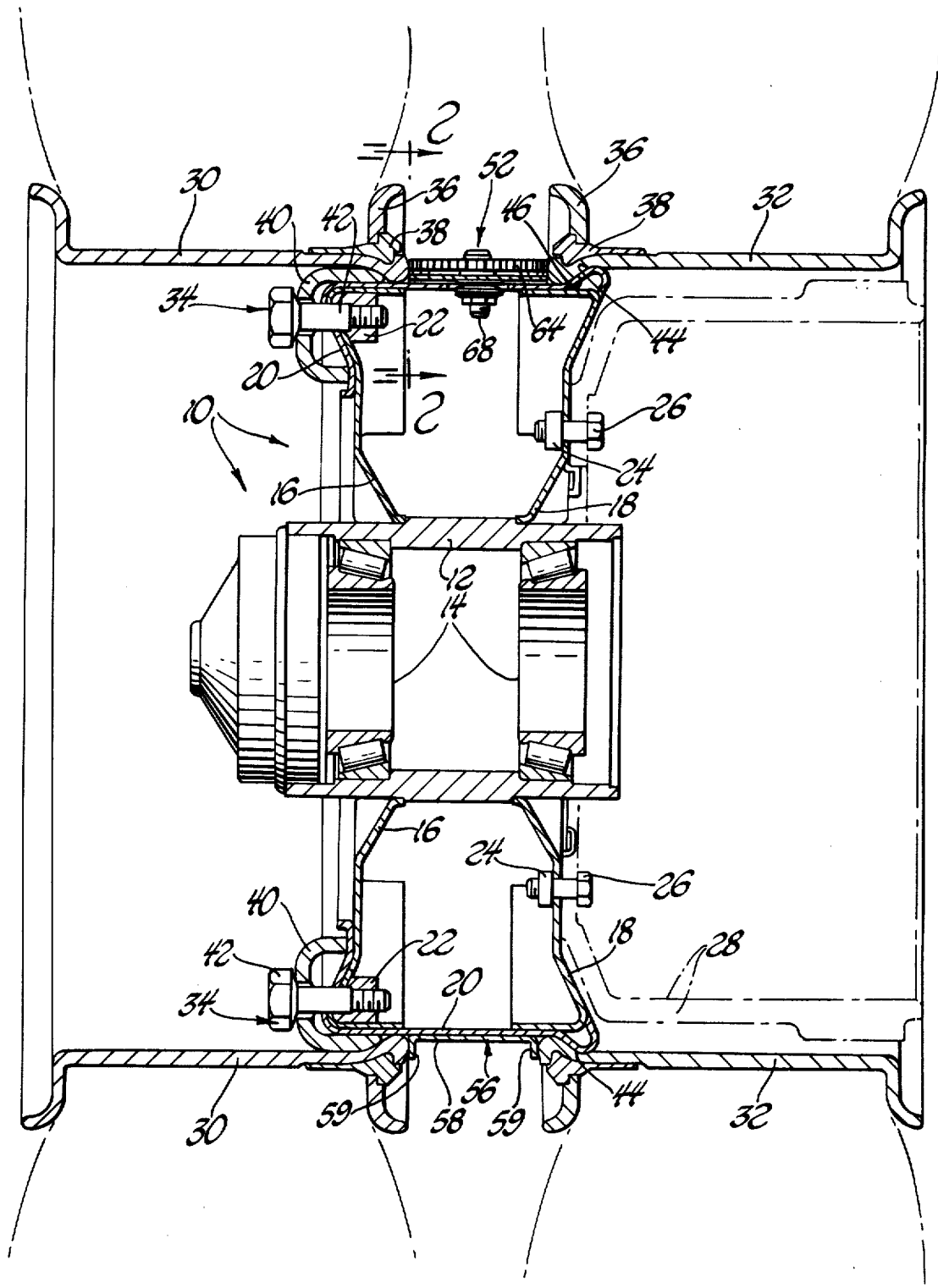
FIG. 1 is a cross-sectional view of the subject invention shown in combination with a wheel supporting dual removable tire rims.
Figure 2:
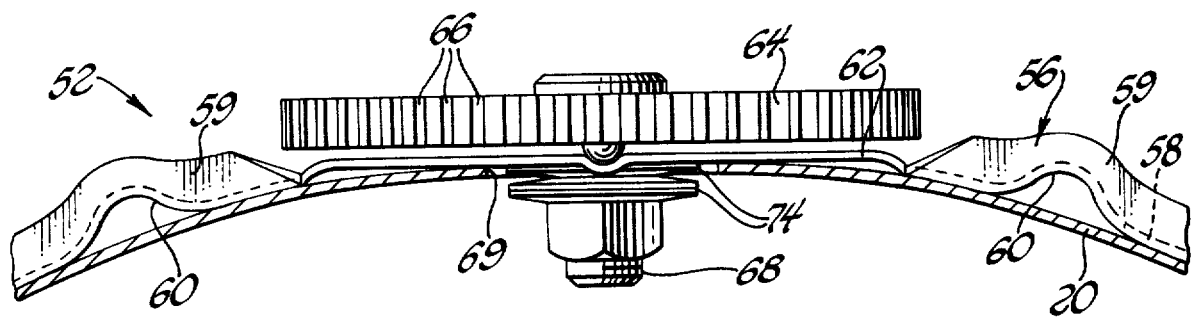
FIG. 2 is an enlarged cross-sectional fragmentary view taken substantially along line 2—2 of FIG. 1.
Figure 3:
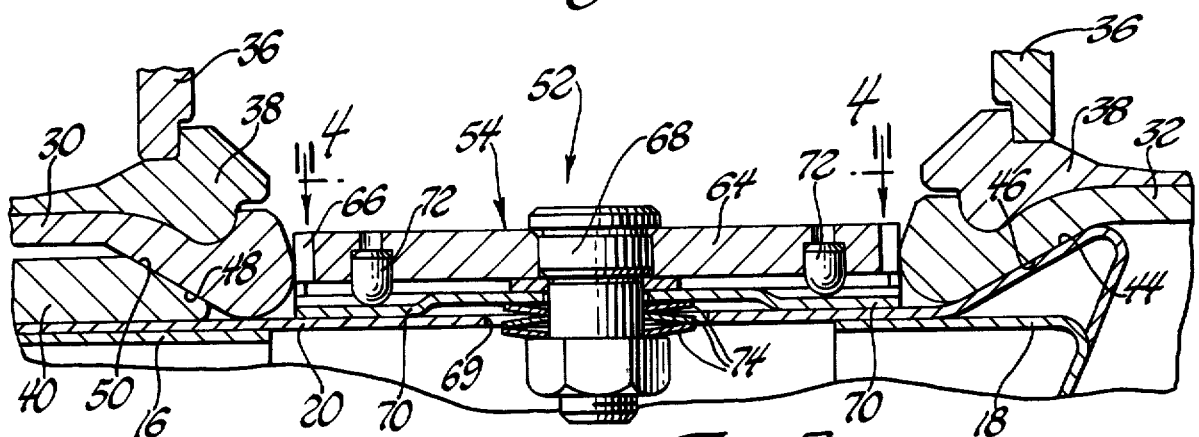
FIG. 3 is an enlarged fragmentary cross-sectional view of the upper central portion of FIG. 1.

A vehicle wheel assembly incorporating the subject invention is shown in FIG. 1. The assembly includes a wheel means generally shown at 10. The wheel means includes a hub 12 which is, in turn, supported on an axle (not shown) through bearings 14. The wheel means 10 includes the radially extending wheel structure components 16 and 18 which are metal stampings secured to the hub 12 and interconnected by an annular stamped cap member 20. Threaded nuts 22 are welded to the stamping member 16. Similar nuts 24 are welded to the stamping member 18 for receiving the bolts 26 which, in turn, support a brake drum shown in phantom at 28. It will be appreciated that the wheel means may take many of various known and yet to be designed constructions.

Supported upon the wheel means 10 are a pair of first and second tire supporting rims 30 and 32 respectively. The rims 30 and 32 are removably supported on the wheel means 10 by the clamping means generally indicated at 34. The outer rim 30 is of identical structure to the inner rim 32 but the rims are disposed in opposed relationship to one another. The rims 30 and 32 are of conventional construction and include the removable tire retaining members 36 and 38.

The clamping means 34 applies a retaining force between the wheel means 10 and the rims 30 and 32 for preventing rotation of the rims 30 and 32 relative to the wheel means 10. The clamping means 34 includes a plurality of lugs 40 and associated threaded lug bolts 42 which threadedly engage the nuts 22 of the wheel means 10 for holding the lugs 40 in position. The wheel means 10 includes an annular outwardly facing tapered surface 44. In other words, the surface 44 is tapered upwardly and outwardly from the central plane of the wheel and extends annularly about the circumference of the wheel means. The inward rim 32 includes an annular inwardly facing tapered surface 46 which is disposed in engagement with the tapered surface 44. In a similar fashion, the outward rim 30 has an annular inwardly facing tapered surface 48. Each of the lugs 40 has an annular outwardly facing tapered surface 50 for engaging the tapered surface 48 of the outward rim 30. As will be appreciated, upon tightening of the lug bolts 42, the lugs 40 urge the outer rim 30 to move axially towards the inner rim 32.

A spacer assembly generally shown at 52 is disposed axially between the first and second tire supporting rims 30 and 32 and transmits forces applied by the lugs 40 from the outward rim 30 to the inner rim 32. As the lug bolts 42 are tightened, a sufficient force is applied to the rims 30 and 32 to prevent their rotation relative to the wheel means 10. The spacer assembly 52 includes rim lock means generally indicated at 54 for re-establishing the rim retaining force in response to relative rotation between the rims 30 and 32. The spacer assembly includes a support means generally indicated at 56 and defined by an annular or circular band defined by a base 58 extending circumferentially and annularly about the wheel means 30 and extending laterally between the rims 30 and 32. At the lateral extremities of the base 58 are the radially extending flanges 59. Flanges 59 abut the rims 30 and 32. The base of the support means 56 also includes the corrugations or strengthening ribs 60 extending laterally from one side to the other thereof. The base 58 follows a circular path except for the corrugations 60 and except for the flat portions 62. Preferably, there are three such flat portions 62 spaced 120° apart about the circumference of the spacer means 52. It will be noted that the flanges 59 are discontinued or have spaces coextensive with the flat portions 62.

A rim lock means 54 is supported at each of the flat portions 62. The rim lock means 54 is disposed between and in engagement with the adjacent rims 30 and 32. The lug bolts 42 urge the lugs 40 against the outer rim 30 to urge the outer rim 30 against the rim lock means 54 which are, in turn, urged against the inner rim 32. Said another way, the rim lock means 54 are disposed between the first and second rims 30 and 32 for urging the first rim 30 against the force supplied thereto by the lug bolts 42 and lugs 40.

Figure 4:
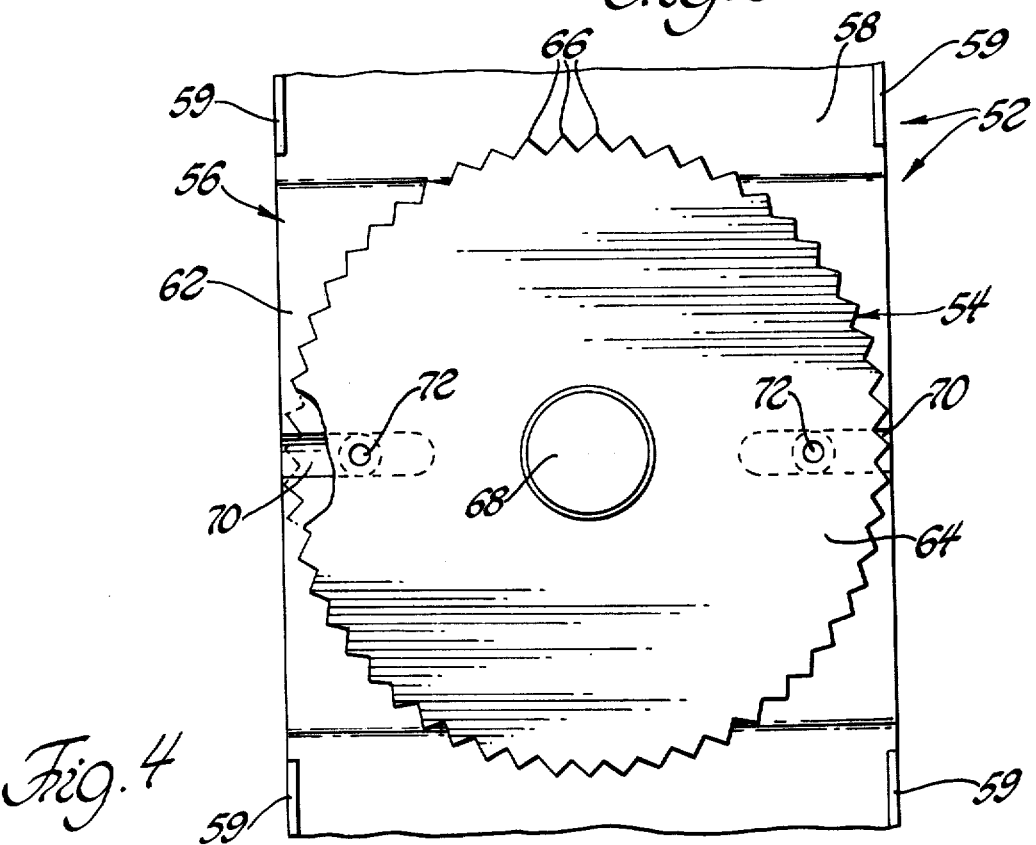
FIG. 4 is a view taken substantially along line 4—4 of FIG. 3 and partially broken away.

The rim lock means includes a cam means or cam plate 64. Each cam plate 64 is elliptical, as viewed in plan, and is rotatably supported at a central axis on each flat portion 62 for forcing the rims 30 and 32 apart in response to relative rotation between the rims 30 and 32. Each cam plate 64 has a peripheral surface which is oval for engaging the rims and which includes friction means defined by serrations 66 for inhibiting slippage between each cam plate 64 and the adjacent rims 30 and 32. As best shown in FIG. 4, the cam plate 64 includes opposed surfaces which are 180° apart and which are closest to the central axis of the cam plate and are shown in engagement with the adjacent rims 30 and 32.

A shaft bolt 68 rotatably supports each cam plate 64 on a flat portion 62 for rotation about the central axis of the cam plate 64. The stamped cap member 20 has openings 69 therein through which the shaft bolt assembly 68 extends. In wheel assemblies of the type including spokes the bolt shafts 68 may be disposed circumferentially between adjacent spokes.

There is also included indicator means for indicating when the opposed peripheral surfaces of the cam plate closest to the central axis defined by the bolt shaft 68 are in engagement with the rims 30 and 32. The indicator means includes the detent 70 and the bullet-shaped protuberances 72. The protuberances 72 are bullet-shaped members removably disposed in bores in the cam plate 64 and the detents are valleys, grooves or recesses, or the like in the flat portion 62 of the support means. There is also included biasing means comprising the Belleville-type spring members 74 which react between the flat portion 62 of the support means and the shaft bolt assembly 68 of the cam plate 64 for urging the bullet-like protuberances 72 into the detents 70 but also allows the cam plate 64 to move axially of the shaft bolt 68 as the cam plate 64 rotates to move the protuberances 72 out of the detents 70 whereby the protuberances 72 ride upon the top surface of the flat portion 62.

OPERATION

First, the inward rim 32 is placed upon the wheel means 10 and thereafter the spacer assembly 52 is positioned annularly about the wheel means and thereafter the outward rim 30 is placed in position. The rims 30 and 32 are then retained in forceful gripping relationship with the wheel means 10 by the lugs 40 and the lug bolts 42 which apply a force to the outward rim 30 urging it axially against the spacer assembly 52 which, in turn, transmits the force to the inner rim 32. A sufficient retaining force is applied by the lug bolts 42 to prevent the rims 30 and 32 from rotating relative to the wheel means 10. During this assembly the three cam plates 64 associated with the spacer assembly 52 are positioned with the protuberances 72 disposed in the detents 70 so that the flat sides of the elliptical shape of each cam plate engage the adjacent rims 30 and 32.

In the event the lug bolts 42 loosen slightly after assembly, the very minutest amount of looseness will allow a minute rotation of one of the rims 30 or 32, or both, relative to the wheel means 10. If the lug bolts loosen a slight amount and the truck moves about a corner or executes a turn, one of the rims 30 or 32 will have the tendency to rotate faster than the other because it will be on a greater radius of turn. Consequently, there will be effected relative rotation between the rims 30 and 32 as they move about each turn. Thus, in the event the lug bolts 42 become sligtly loose, there will be relative rotation between the rims 30 and 32. As the rims 30 and 32 rotate relative to one another, each cam plate 64, being in engagement with the adjacent rims 30 and 32, will be caused to rotate about its central axis as defined by the bolt shafts 68. Since the cam plates 64 are elliptical, the periphery of each cam plate has an increasing radius from the axis of rotation thereby forcing the rims 30 and 32 apart to re-establish the retaining force to prevent the rotation of the rims 30 and 32 relative to the wheel means when the cam plates rotate. In other words, the rotation of each elliptical cam 64 re-establishes the tensile loads on the lug bolts 42 to re-establish the forces necessary to prevent rotation of the rims 30 and 32 relative to the wheel means.

A truck operator may periodically check the angular position of the cam plates 64 and if the protuberances 72 have moved in a circular path and are out of the detents 70 he knows that the lug bolts 42 have loosened. He may then loosen the lug bolts, reposition the cam plates 64 to the initial position shown in FIG. 4 and retighten the lug bolts.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A vehicle wheel assembly; wheel means, first and second tire supporting rims removably supported on said wheel means, clamping means to apply a retaining force between said wheel means and said rims for clamping the rims together for preventing rotation of said rims relative to said wheel means, and rim lock means reacting between said rims for urging said rims apart and against said retaining force in response to relative rotation between said rims.

2. An assembly as set forth in claim 1 wherein said rim lock means is disposed between and in engagement with said rims.

3. An assembly as set forth in claim 1 wherein said clamping means is operatively connected to said wheel means and applies said force against said first rim for urging said first rim toward said second rim.

4. An assembly as set forth in claim 3 wherein said rim lock means is disposed between said first and second rims for urging said first rim against said force applied thereto by said clamping means.

5. An assembly as set forth in claim 4 wherein said rim lock means includes cam means engaging said rims for forcing said rims apart in response to said relative rotation therebetween.

6. An assembly as set forth in claim 5 wherein said cam means includes at least one elliptical cam plate rotatably supported at a central axis thereof.

7. An assembly as set forth in claim 6 wherein said cam plate has a peripheral surface for engaging said rims and which includes friction means for inhibiting slippage between said cam plate and said rims.

8. An assembly as set forth in claim 7 wherein said rim lock means includes indicator means for indicating when the opposed peripheral surfaces of said cam plate closest to said central axis are in engagement with said rims.

9. An assembly as set forth in claim 8 including support means rotatably supporting said cam plate for rotation about said central axis.

10. An assembly as set forth in claim 9 wherein said indicator means includes at least one detent and a protuberance for coacting therewith interconnecting said support means and said cam plate.

11. An assembly as set forth in claim 10 including biasing means for urging said protuberance into said detent.

12. An assembly as set forth in claim 10 including biasing means disposed between said support means and said cam plate for urging said protuberance into said detent and for allowing said cam plate to move axially of said central axis when said protuberance moves out of said detent as said cam plate rotates about said central axis.

13. An assembly as set forth in claim 9 wherein said support means is annular and extends annularly about said wheel means between said rims.

14. An assembly as set forth in claim 13 including a plurality of said cam plates spaced circumferentially about said annular support means.

15. An assembly as set forth in claim 13 wherein said support means comprises a spacer disposed between said rims and including a flat portion in the anular circumference thereof for rotatably supporting said cam plate.

16. An assembly as set forth in claim 15 wherein said spacer includes radially extending flanges extending circumferentially thereabout except along said flat portion for allowing said cam plate to engage said rims.

17. An assembly as set forth in claim 16 wherein said wheel means includes an annular outwardly facing tapered surface, said second rim includes an annular inwardly facing tapered surface in engagement with said annular outwardly facing tapered surface, said spacer engaging said second rim adjacent said tapered surfaces, said first rim having annular inwardly facing tapered surface adjacent said spacer, said clamping means including a plurality of lugs each having an annular outwardly facing tapered surface engaging said tapered surface of said first rim, and a threaded lug bolt interconnecting each of said lugs and said wheel means for moving said lugs axially to urge said first rim against said spacer and said spacer against said second rim.

18. A spacer assembly of the type disposed axially between first and second tire supporting rims which are removably retained on wheel means by clamping means to apply a retaining force between the wheel means and the rims to prevent rotation of the rims relative to the wheel means, said assembly comprising: support means, and rim lock means supported by said support means for reacting between the rims for urging the rims apart and against the retaining force in response to relative rotation between the rims.

19. An assembly as set forth in claim 18 wherein said rim lock means includes cam means for engaging and forcing the rims apart in response to the relative rotation therebetween.

20. An assembly as set forth in clain 19 wherein said cam means includes at least one elliptical cam plate rotatably supported by said support means at a central axis thereof.

21. An assembly as set forth in claim 20 wherein said cam plate has a peripheral surface for engaging the rims and which includes friction means for inhibiting slippage between said cam plate and the rims.

22. An assembly as set forth in claim 20 wherein said rim lock means includes indicator means for indicating when the opposed peripheral surfaces of said cam plate closest to said central axis are positioned for engagement with the rims.

23. An assembly as set forth in claim 20 wherein said support means is annular for extending circumferentially about the wheel means between the rims.

24. An assembly as set forth in claim 23 wherein said rim lock means includes a plurality of said cam plates spaced circumferentially about said annular support means.

25. A spacer assembly for separating a pair of tire rims on a vehicle wheel and comprising an annular base having a plurality of flat portions substantially equally spaced about its circumference and extending laterally between the sides of the base, an elliptical cam plate rotatably supported on each one of said flat portions for engaging the pair of tire rims.

* * * * *